United States Patent
Hashimoto et al.

(10) Patent No.: US 11,584,581 B2
(45) Date of Patent: Feb. 21, 2023

(54) CUSHIONING MEMBER AND METHOD FOR MANUFACTURING CUSHIONING MEMBER

(71) Applicant: KONICA MINOLTA, INC., Tokyo (JP)

(72) Inventors: Takeshi Hashimoto, Okazaki (JP); Narutaka Yoshida, Toyokawa (JP); Hiromi Mizuguchi, Toyokawa (JP); Yasuki Shirakawa, Toyokawa (JP); Masao Itoh, Toyokawa (JP); Tomoyuki Imaizumi, Nagoya (JP); Masahiro Arisawa, Toyokawa (JP)

(73) Assignee: KONICA MINOLTA, INC., Tokyo (JP)

( * ) Notice: Subject to any disclaimer, the term of this patent is extended or adjusted under 35 U.S.C. 154(b) by 334 days.

(21) Appl. No.: 16/740,746

(22) Filed: Jan. 13, 2020

(65) Prior Publication Data
US 2020/0231358 A1    Jul. 23, 2020

(30) Foreign Application Priority Data

Jan. 17, 2019  (JP) .............................. JP2019-005896
Jun. 26, 2019  (JP) .............................. JP2019-118494

(51) Int. Cl.
*B65D 81/05*     (2006.01)
*B31D 5/00*      (2017.01)
*F16K 15/14*     (2006.01)

(52) U.S. Cl.
CPC ......... *B65D 81/052* (2013.01); *B31D 5/0073* (2013.01); *B65D 81/053* (2013.01); *F16K 15/14* (2013.01); *B31D 2205/0005* (2013.01)

(58) Field of Classification Search
CPC ..... B65D 81/052; B65D 81/05; B65D 81/053
(Continued)

(56) References Cited

U.S. PATENT DOCUMENTS

| 5,826,723 A | 10/1998 | Jaszai |
| 7,000,767 B2 * | 2/2006 | Tanaka ................. B65D 81/052 383/3 |

(Continued)

FOREIGN PATENT DOCUMENTS

| JP | H07165265 A | 6/1995 |
| JP | 2004338785 A | 12/2004 |

OTHER PUBLICATIONS

Office Action (Notice of Reasons for Refusal) dated Nov. 8, 2022, in corresponding Japanese Patent Application No. 2019-118494 and English translation of the Office Action. (6 pages).

*Primary Examiner* — Steven A. Reynolds
(74) *Attorney, Agent, or Firm* — Buchanan Ingersoll & Rooney PC

(57) ABSTRACT

A cushioning member includes: an accommodating bag portion that accommodates a medium; a first fusing portion that defines the accommodating bag portion such that the accommodating bag portion is provided with an opening; a check valve having a first end located inside the accommodating bag portion and a second end located outside the accommodating bag portion, and provided at the opening; a second fusing portion that is immediately adjacent to the first fusing portion on those external sides of the check valve which are opposite in a direction intersecting a direction in which the check valve protrudes from the accommodating bag portion, and defines a channel that communicates with the opening; and a third fusing portion that is connected to the second fusing portion and seals the channel, the third fusing portion being provided across a portion of the check valve that protrudes from the accommodating bag portion.

12 Claims, 14 Drawing Sheets

(58) Field of Classification Search
USPC .................................................. 206/522, 521
See application file for complete search history.

(56) References Cited

U.S. PATENT DOCUMENTS

| | | | |
|---|---|---|---|
| 7,204,278 B2* | 4/2007 | Koyanagi | B31D 5/0073 |
| | | | 141/10 |
| 2006/0144745 A1* | 7/2006 | Abe | B65D 81/052 |
| | | | 206/522 |
| 2006/0191815 A1* | 8/2006 | Nishi | B31D 5/0073 |
| | | | 206/522 |

* cited by examiner

CUSHIONING MEMBER AND METHOD FOR MANUFACTURING CUSHIONING MEMBER

The entire disclosure of Japanese Patent Application No. 2019-005896, filed on Jan. 17, 2019, and that of Japanese patent Application No. 2019-118494, filed on Jun. 26, 2019, are incorporated herein by reference in their entireties.

BACKGROUND

Technological Field

The present invention relates to a cushioning member used when packing an object to be packed and a method for manufacturing the cushioning member.

Description of the Related Art

A cushioning member used in packing an object to be packed is disclosed for example in Japanese Laid-Open Patent Publication No. 2004-338785.

The cushioning member disclosed in Japanese Laid-Open Patent Publication No. 2004-338785 includes: a medium accommodating portion for accommodating a medium; a non-return valve for passing the medium to the medium accommodating portion and stopping the medium away from the medium accommodating portion; an introducing portion for introducing the medium into the medium accommodating portion with the non-return valve from an outside of the packing member to balloon the medium accommodating portion; and a sealing region disposed upstream of the non-return valve with respect to a direction of the introduction of the medium from the introducing portion toward the non-return valve for sealing the introducing portion to prevent the medium flowing back from the medium accommodating portion via the non-return valve to the introducing portion from leaking from the introducing portion to an outside of the packing member, the sealing region being sealed after the medium is accommodated in the medium accommodating portion. In addition, a plurality of medium accommodating portions are provided, and the introducing portion is provided independently depending on the number of medium accommodating portions.

SUMMARY

When an object to be packed is packed using a cushioning member and an external force is applied thereto, the cushioning member may be externally pressed. With the cushioning member disclosed in Japanese Patent Laid-Open No. 2004-338785, when the non-return valve is damaged or a pressure exceeding the non-return valve's sealing ability is applied, a portion of the medium accommodated in the medium accommodating portion moves through the non-return valve to the introducing portion and internal leakage occurs. In that case, the amount of the medium accommodated in the medium accommodating portion is reduced, and the cushioning function by the cushioning member is thus impaired.

The present invention has been made in view of the above problems, and an object of the present invention is to provide a cushioning member which can suppress reduction of a cushioning function, and a method for manufacturing the cushioning member.

To achieve at least one of the above mentioned objects, according to an aspect of the present invention, a cushioning member reflecting a first aspect of the present invention is composed of at least one resin sheet fused in the form of a bag. The cushioning member comprises: an accommodating bag portion that accommodates a medium; a first fusing portion that defines the accommodating bag portion such that the accommodating bag portion is provided with an opening allowing the medium to pass therethrough; a check valve having a first end and a second end and provided at the opening such that the first end is located inside the accommodating bag portion and the second end is located outside the accommodating bag portion; the medium accommodated in the accommodating bag portion; a second fusing portion that is immediately adjacent to the first fusing portion on those end sides of the check valve which are opposite in a direction intersecting a direction in which the check valve protrudes from the accommodating bag portion, and defines a channel that communicates with the opening; and a third fusing portion that is connected to the second fusing portion and seals the channel. The third fusing portion is provided across a portion of the check valve that protrudes from the accommodating bag portion.

Note that the third fusing portion being provided across the check valve also includes a case in which the fusing portion is provided to cover the second end when the check valve is processed to be less fusible in the vicinity of the opening.

To achieve at least one of the abovementioned objects, according to an aspect of the present invention, a cushioning member reflecting a second aspect of the present invention is composed of at least one resin sheet fused in the form of a bag. The cushioning member comprises: a plurality of accommodating bag portions having check valves, respectively, and accommodating a medium introduced from inlets of the check valves, respectively; and a fusing portion at which the inlets are fused to prevent the medium from moving between the plurality of accommodating bag portions.

To achieve at least one of the abovementioned objects, according to an aspect of the present invention, a method for manufacturing a cushioning member reflecting a third aspect of the present invention is a method for manufacturing a cushioning member composed of at least one resin sheet fused in the form of a bag. The method for manufacturing a cushioning member comprises: fusing the at least one resin sheet in the form of the bag to form a plurality of accommodating bag portions having check valves, respectively, and capable of accommodating a medium; introducing the medium into the accommodating bag portions via the check valves from a channel provided upstream of the check valves; and fusing the check valves' inlets after the medium is introduced into the accommodating bag portions.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments. In the embodiment described below, while a case where an object to be packed is an image formation apparatus will be described as an example, this is not exclusive and it may be a relatively large precision machine such as a printer. In the following embodiments, identical or common components are identically denoted in the figures and will not be described redundantly. When there are a plurality of embodiments below, it is planned from the beginning to appropriately combine features of the embodiments unless otherwise specified.

First Embodiment

Figure 1:
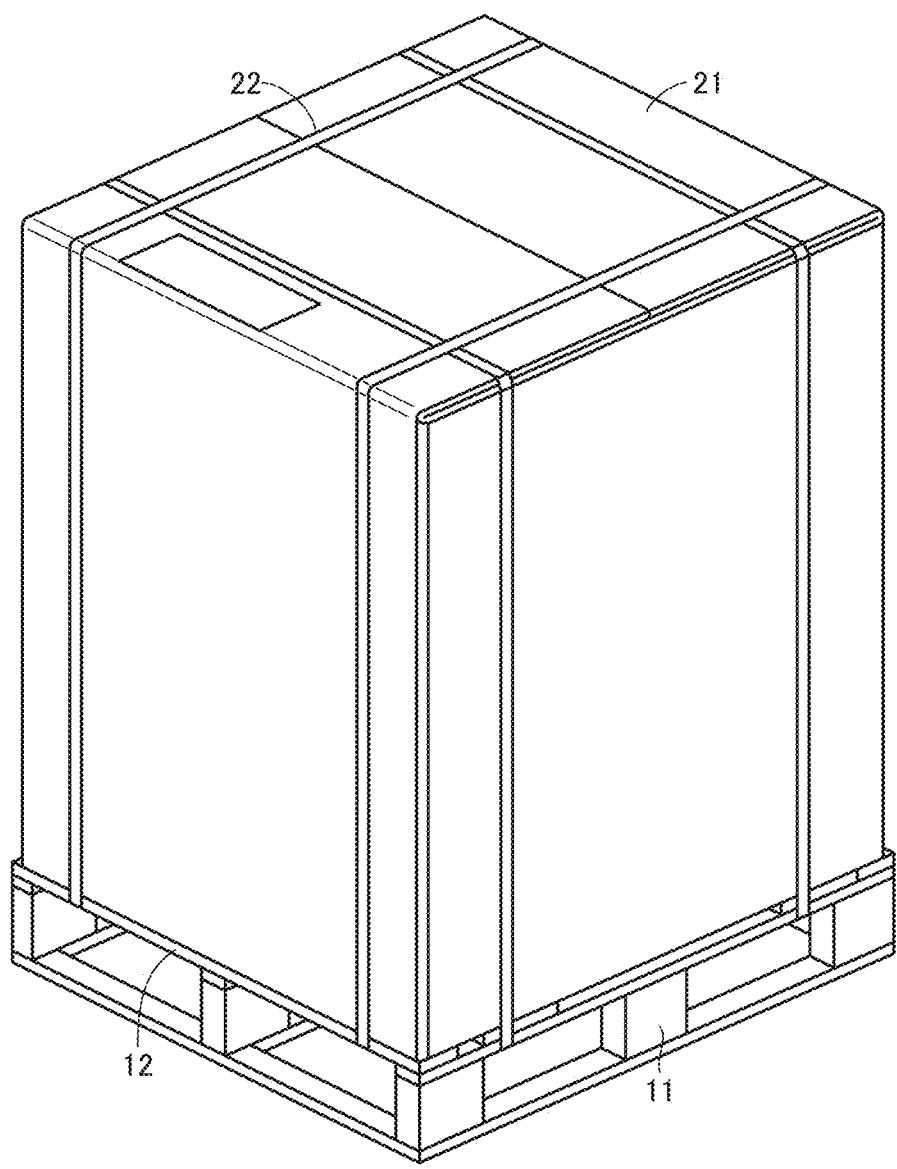
FIG. 1 is a schematic diagram illustrating a packing state in which an image formation apparatus according to a first embodiment is packed.
Figure 2:
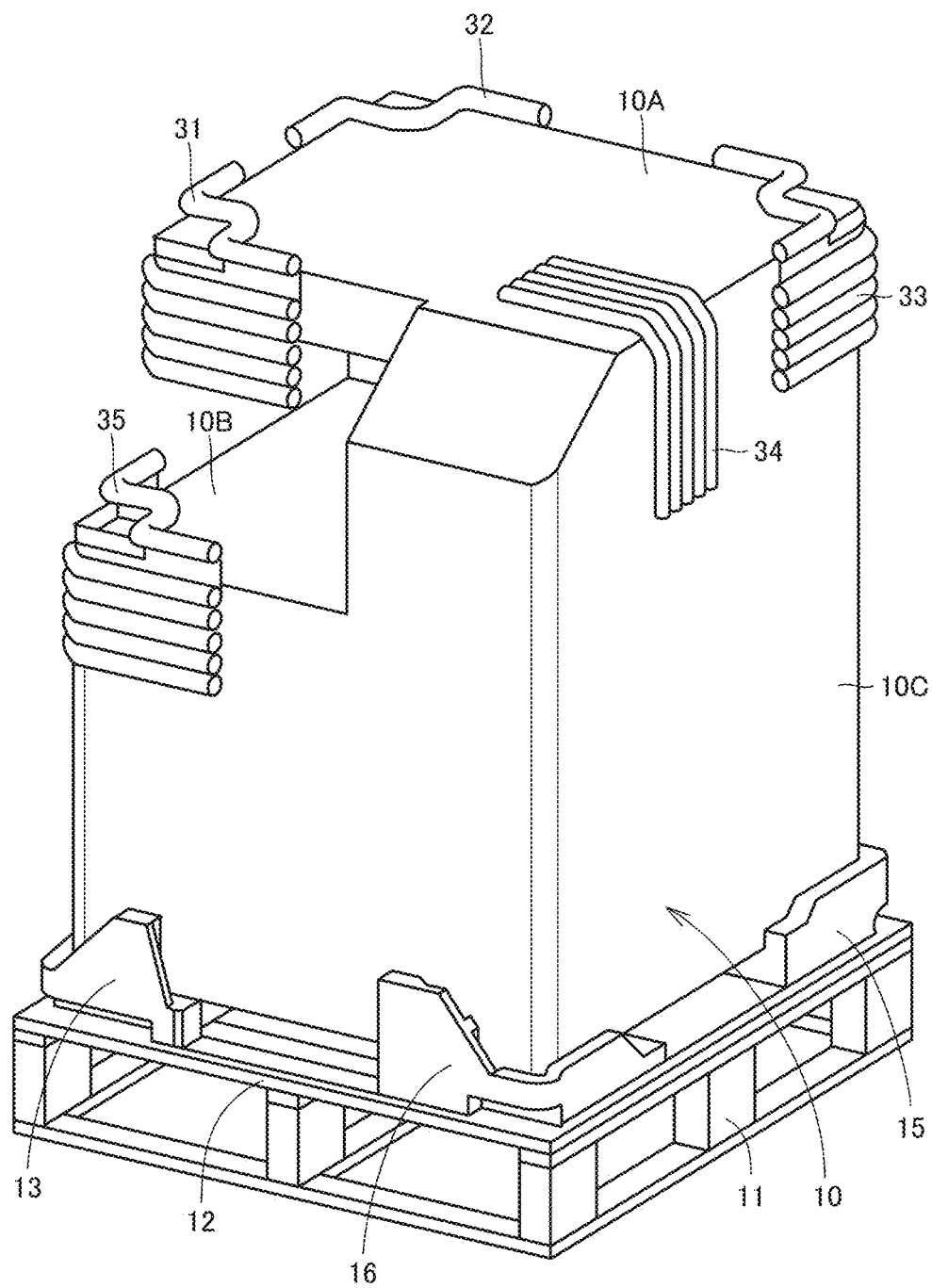
FIG. 2 is a diagram illustrating a state where an exterior box is removed from the packing state illustrated in FIG. 1.
Figure 3:
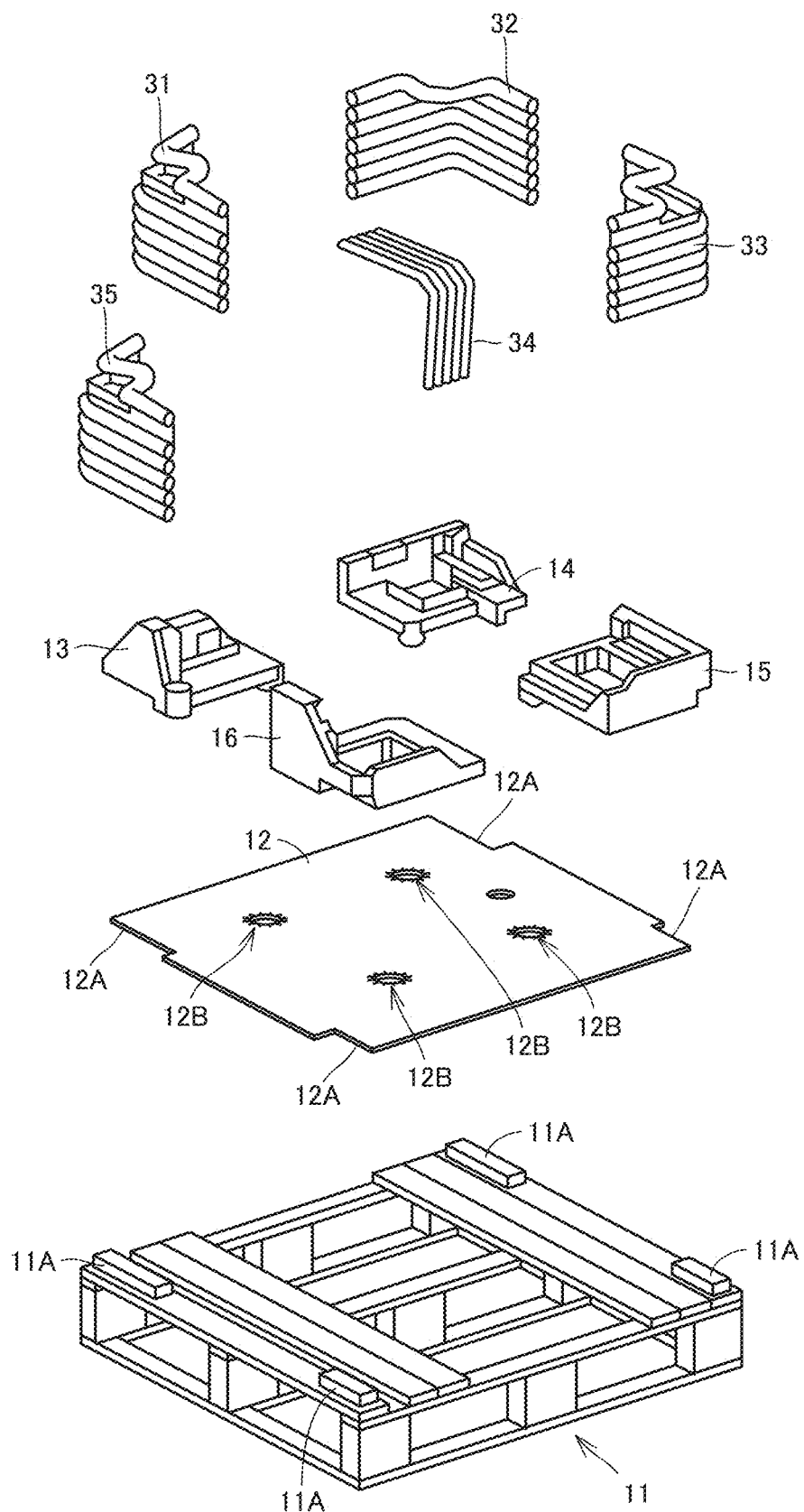
FIG. 3 is an exploded perspective view of a plurality of members used for packing the image formation apparatus shown in FIG. 2.

FIG. 1 is a schematic diagram illustrating a packing state in which an image formation apparatus according to a first embodiment is packed. FIG. 2 is a diagram illustrating a state where an exterior box is removed from the packing state illustrated in FIG. 1. FIG. 3 is an exploded perspective view of a plurality of members used for packing the image formation apparatus shown in FIG. 2. The packing state in which image formation apparatus 10 is packaged will be described with reference to FIGS. 1 to 3.

As shown in FIGS. 1 to 3, when image formation apparatus 10 is packed, a pallet 11, a plate-shaped pad 12, a plurality of foams 13 to 16, a plurality of cushioning members 31 to 35, an exterior box 21, and a fixing member 22 are used.

Pallet 11 is generally configured by combining wooden plate materials. Pallet 11 may be formed of a resin member. A positioning member 11A for positioning plate-shaped pad 12 and the plurality of foams 13 to 16 is provided at the four corners of the upper surface of pallet 11. Positioning member 11A is, for example, a squared member.

Plate-shaped pad 12 is generally formed by punching corrugated cardboard. Plate-shaped pad 12 is not limited to corrugated cardboard, and may be formed of a plastic or similar, resin member.

A notch 12A is provided at the four corners of plate-shaped pad 12. Notch 12A engages with positioning member 11A when plate-shaped pad 12 is placed on pallet 11. Plate-shaped pad 12 is thus positioned.

Plate-shaped pad 12 is provided with a plurality of engagement holes 12B. The plurality of engagement holes 12B are used for positioning the plurality of foams 13-16. A radial slit is provided around engagement hole 12B.

Foams 13 to 16 are a molded article of foamed polystyrene. Foams 13 to 16 are provided to support the bottom surface of image formation apparatus 10 and come into contact with the side surfaces of a main body 10C of image formation apparatus 10. Foams 13 to 16 are formed depending on the shapes of the four corners of main body 10C.

Figure 4:
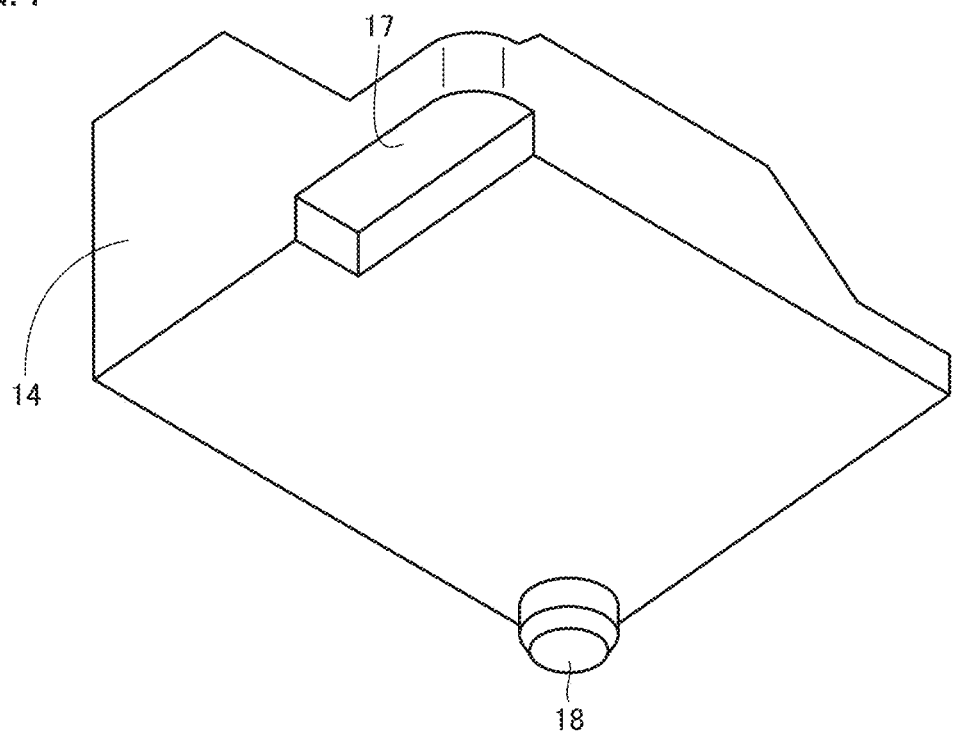
FIG. 4 is a perspective view of a foam of the plurality of members shown in FIG. 3 as viewed on the side of the bottom surface.

FIG. 4 is a perspective view of a foam of the plurality of members shown in FIG. 3, as viewed on the side of the bottom surface. As shown in FIG. 4, foam 14 has a bottom surface provided with an engagement recess 17 recessed upward and an engagement protrusion 18 protruding downward. Foams 13, 15 and 16 are similarly provided with engagement recess 17 and engagement protrusion 18.

The plurality of foams 13 to 16 each have engagement recess 17 to engage positioning member 11A of pallet 11, and engagement protrusion 18 to engage engagement hole 12B. The plurality of foams 13 to 16 are thus positioned.

Referring again to FIGS. 1 to 3, the plurality of cushioning members 31 to 35 are respectively disposed at a plurality of corners of image formation apparatus 10. For example, the plurality of cushioning members 31 to 34 are disposed at the four corners of a reading device 10A included in image formation apparatus 10. Cushioning member 35 is disposed at a corner of a discharge tray 10B included in image formation apparatus 10.

The plurality of cushioning members 31 to 35 are each bent at a substantially central portion so as to come into contact with at least two sides of reading device 10A constituting a corner. The bent portions of the plurality of cushioning members 31 to 35 are disposed so as to face a plurality of ridges of image formation apparatus 10, respectively.

A plurality of cushioning members 31 to 33 each mainly come into contact with adjacent ones of a plurality of side surfaces of reading device 10A. The plurality of cushioning members 31 to 33 have upper portions coming into contact with the upper surface of reading device 10A. Cushioning member 34 comes into contact with the upper and side surfaces of reading device 10A. Cushioning member 34 comes into contact with two side surfaces of main body 10C located in the vicinity of discharge tray 10B.

When image formation apparatus 10 is covered with exterior box 21, the plurality of cushioning members 31 to 35 are sandwiched between image formation apparatus 10 and exterior box 21. The plurality of cushioning members 31 to 35 alleviate external force acting on exterior box 21. The plurality of cushioning members 31 to 35 will more specifically be described hereinafter with reference to FIGS. 5 to 9.

When packing image formation apparatus 10, initially, plate-shaped pad 12 is placed on pallet 11, and the plurality of foams 13 to 16 are disposed on plate-shaped pad 12. Subsequently, image formation apparatus 10 wrapped in a protective plastic bag (not shown) is disposed on the plurality of foams 13 to 16, and the plurality of cushioning members 31 to 35 are disposed at a plurality of corners of image formation apparatus 10.

Subsequently, with the plurality of cushioning members 31 to 35 disposed at the corners of image formation apparatus 10, they are covered with exterior box 21 having a bottom side open. Exterior box 21 is made of corrugated cardboard or the like, for example. Subsequently, exterior box 21 and pallet 11 are fixed using fixing member 22 such as a plastic tape.

Thus, an object to be packed such as image formation apparatus 10 is packed using the plurality of cushioning members 31 to 35.

Figure 5:
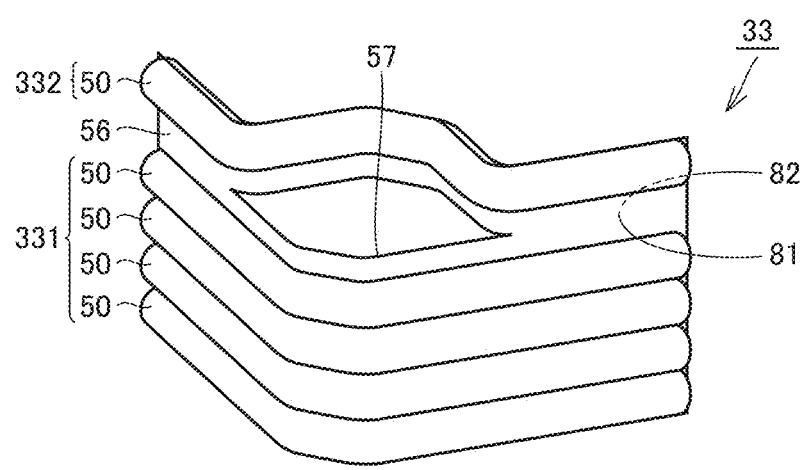
FIG. 5 is a perspective view showing a cushioning member according to the first embodiment.
Figure 6:
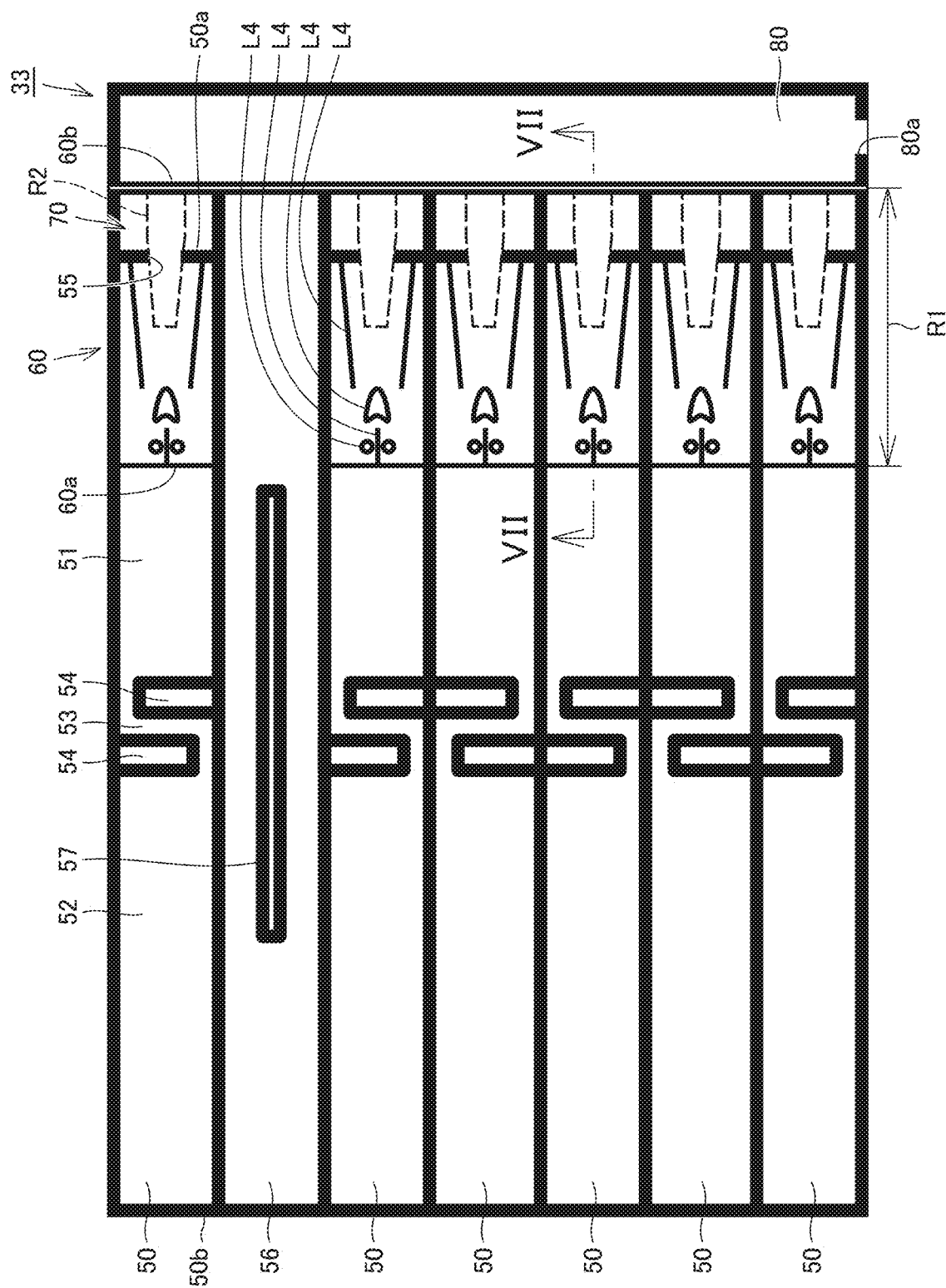
FIG. 6 is a plan view showing the cushioning member according to the first embodiment.

FIG. 5 is a perspective view showing a cushioning member according to the first embodiment. FIG. 6 is a plan view showing the cushioning member according to the first embodiment. In FIG. 6, a mainly fused portion is indicated by a thick black line. With reference to FIGS. 5 and 6, of the cushioning members 31 to 35, a structure of cushioning member 33 will specifically be described. Note that the other cushioning members 31, 32, 34 and 35 have substantially the same structure as that of cushioning member 33, and accordingly, will not be described redundantly.

As shown in FIG. 5, cushioning member 33 is formed by fusing a first resin sheet 81 and a second resin sheet 82, which will be described hereinafter, in the form of a bag. Cushioning member 33 includes a plurality of accommodating bag portions 50. The plurality of accommodating bag portions 50 each accommodate air as a medium. The plurality of accommodating bag portions 50 are aligned in a predetermined direction.

Cushioning member 33 includes a first portion 331 having a plurality of accommodating bag portions 50 successively aligned, a second portion 332 having a single accommodating bag portion 50 disposed in the predetermined direction away from first portion 331, and a connecting portion 56 that connects first portion 331 and second portion 332.

Connecting portion 56 is formed by fusing first resin sheet 81 and second resin sheet 82 in the form of a strip. A notch 57 is provided at a substantially central portion of connecting portion 56. Notch 57 is provided in a direction in which connecting portion 56 extending in the form of a strip extends.

By providing notch 57, second portion 332 can be independently deformed. As a result, second portion 332 can be brought into contact with the upper surface of reading device 10A while first portion 331 is in contact with two side surfaces of reading device 10A.

Note that the number of accommodating bag portions 50 provided in first portion 331 and second portion 332 can be changed as appropriate. Further, cushioning member 33 may be formed so as to include only first portion 331 or may be formed so as to include only second portion 332. Cushioning member 34 described above is formed to include only first portion 331.

As shown in FIG. 6, cushioning member 33 includes a plurality of accommodating bag portions 50 each having a check valve 60 and accommodating a medium introduced through an inlet of check valve 60, and a fusing portion at which each inlet is fused to prevent the medium from moving between the plurality of accommodating bag portions 50 (a third fusing portion L3 described hereinafter).

The plurality of accommodating bag portions 50 extend substantially linearly when viewed in a plan view. The plurality of accommodating bag portions 50 have one end 50a and the other end 50b in a direction in which they extend. The plurality of accommodating bag portions 50 each have an opening 55 at one end 50a.

The plurality of accommodating bag portions 50 include a first chamber 51, a second chamber 52, a connecting path 53, and two strip-shaped fusing portions 54. First chamber 51 and second chamber 52 are aligned in a direction opposite to a direction in which check valve 60 described hereinafter protrudes from accommodating bag portion 50. Specifically, first chamber 51 and second chamber 52 are aligned in a direction in which accommodating bag portion 50 extends.

Connecting path 53 connects first chamber 51 and second chamber 52. Connecting path 53 is dog-legged.

The two strip-shaped fusing portions 54 extend in a plan view in a direction orthogonal to the direction in which accommodating bag portion 50 extends. The two strip-shaped fusing portions 54 are alternately formed in the direction in which accommodating bag portion 50 extends. Thus, connecting path 53 is dog-legged as described above.

Cushioning member 33 further includes a plurality of channels 70 and an introduction path 80. The plurality of channels 70 are provided so as to be adjacent to the plurality of accommodating bag portions 50, respectively. The plurality of channels 70 are each provided on the side of one end 50a of a respective one of accommodating bag portions 50. The plurality of channels 70 communicate with the plurality of accommodating bag portions 50 through opening 55. Introduction path 80 for introducing a medium is provided upstream of the plurality of channels 70. Introduction path 80 is provided with an introduction port 80a, and the medium can be introduced from introduction port 80a. Introduction path 80 is provided so as to be shared by the plurality of channels 70. Introduction path 80 may be provided for each of the plurality of channels 70 independently.

The plurality of check valves 60 are each provided at opening 55 provided for each of the plurality of accommodating bag portions 50. Check valve 60 is provided in a range indicated by an arrow R1 shown in FIG. 6. Check valve 60 passes the air introduced from the side of channel 70 to the side of accommodating bag portion 50 and regulates the air flowing back from accommodating bag portion 50.

Check valve 60 is substantially linearly provided in a plan view. Check valve 60 has a first end 60a and a second end 60b. First end 60a of check valve 60 is located inside accommodating bag portion 50. Second end 60b of check valve 60 is located outside accommodating bag portion 50. Note that although second end 60b is indicated by a white line in FIG. 6 for the sake of convenience, second end 60b is fused by a third fusing portion L3 (see FIG. 9) described hereinafter.

Figure 7:
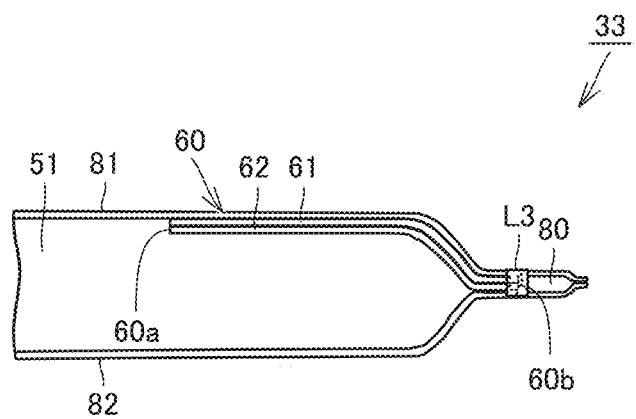
FIG. 7 is a cross section taken along a line VII-VII shown in FIG. 6, and is a cross section showing a configuration of a check valve.

FIG. 7 is a cross section taken along a line VII-VII shown in FIG. 6. As shown in FIG. 7, check valve 60 has a first film 61 and a second film 62. First film 61 and second film 62 are disposed so as to face each other.

As shown in FIGS. 6 and 7, first film 61 and second film 62 are fused to first resin sheet 81 and second resin sheet 82 by a first fusing portion L1 (see FIG. 9) and a second fusing portion L2 (see FIG. 9) which will be described hereinafter. Further, the peripheral edges of first film 61 and second film 62 constituting second end 60b of check valve 60 are fused to first resin sheet 81 and second resin sheet 82 by third fusing portion L3. That is, check valve 60 has an inlet fused by third fusing portion L3.

Further, cushioning member 33 is provided with a fourth fusing portion L4 that defines a channel through which the medium that has passed through opening 55 passes through check valve 60. First film 61 and second film 62 are fused to first resin sheet 81 by fourth fusing portion L4.

A portion of the air introduced into accommodating bag portion 50 enters between second film 62 and second resin sheet 82. Thereby, second film 62 closely comes into contact with first film 61, which can suppress leakage of air from opening 55.

First film 61 may have an inner surface having a portion with a region R2 which is less fusible to prevent fusion of second film 62 to first film 61. When viewed in a plan view, region R2 is provided in the vicinity of opening 55. Region R2 is provided so as to straddle first fusing portion L1 that forms a boundary line between the inside and outside of accommodating bag portion 50. Region R2 is provided so as to pass through opening 55.

First resin sheet 81 and second resin sheet 82 have a multilayer structure in which, for example, nylon and polyethylene are stacked in layers. Region R2 provided to first film 61 has a melting point set higher than that of the remaining portion of first resin sheet 81 and second resin sheet 82.

Figure 8:
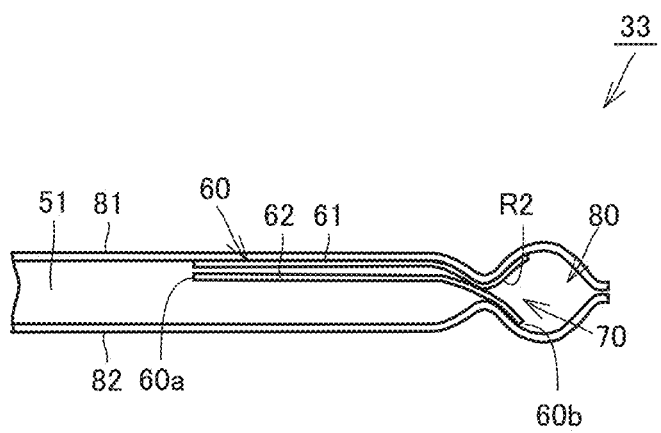
FIG. 8 is a cross section showing a state before an inlet of the check valve shown in FIG. 7 is fused.

FIG. 8 is a cross section showing a state before the inlet of the check valve shown in FIG. 7 is fused. As shown in FIG. 8, with check valve 60 having the inlet opened, air as a medium is introduced into accommodating bag portion 50. The air introduced from introduction path 80 passes in channel 70 through a space between first film 61 and second film 62 and thus passes through opening 55. The air that has passed through opening 55 is introduced into accommodating bag portion 50. After the air is introduced into accommodating bag portion 50, second end 60b of check valve 60 is fused as described above.

Figure 9:
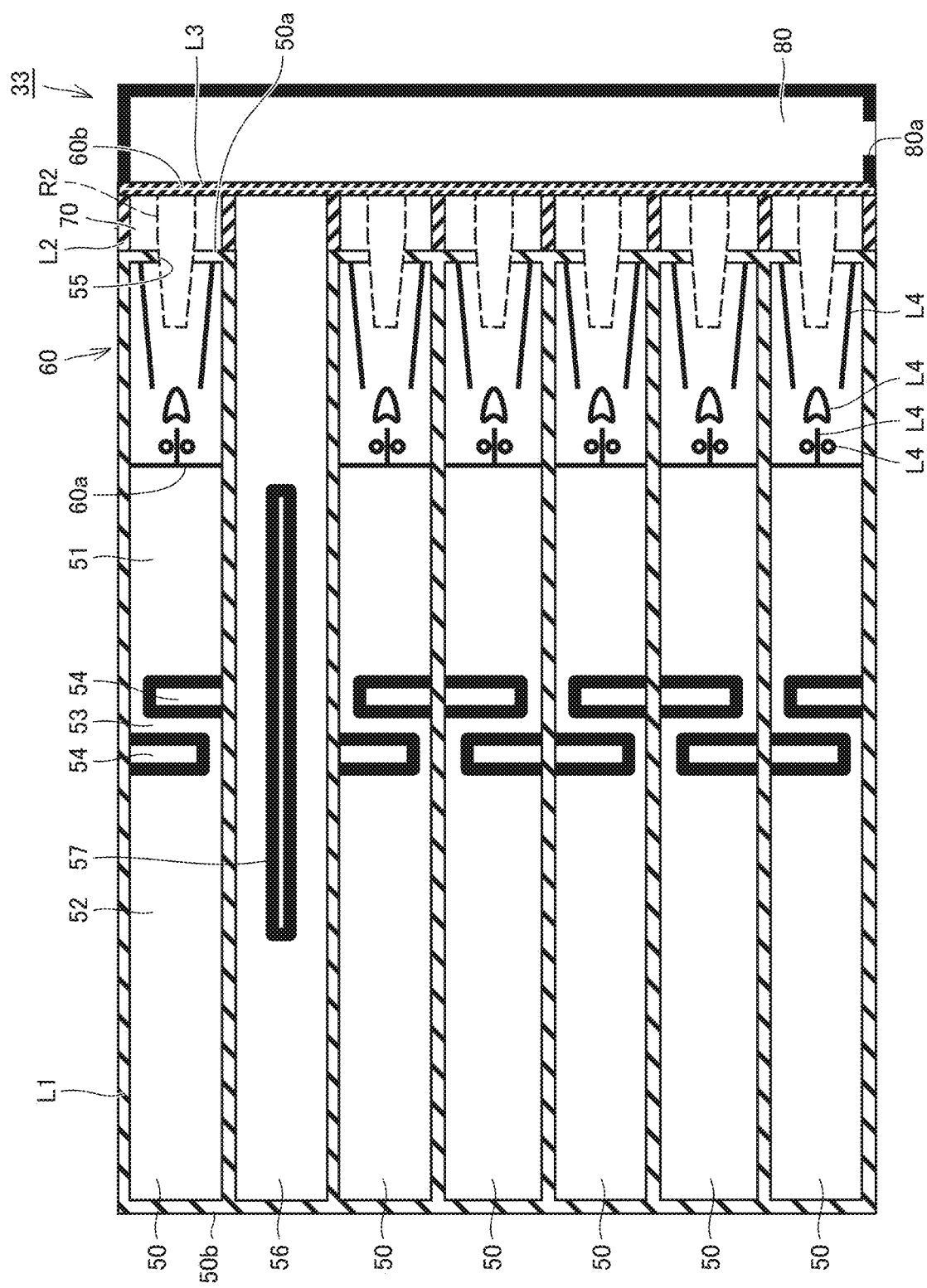
FIG. 9 is a diagram schematically illustrating first, second and third fusing portions in the cushioning member according to the first embodiment.

FIG. 9 is a diagram schematically illustrating first, second and third fusing portions in the cushioning member according to the first embodiment. Note that first fusing portion L1, second fusing portion L2, and third fusing portion L3 are distinguished and illustrated by hatching for the sake of convenience.

As shown in FIG. 9, cushioning member 33 includes first fusing portion L1 indicated by a first hatching with widely spaced lines, second fusing portion L2 indicated by a second hatching with moderately spaced lines, and third fusing portion L3 indicated by a third hatching with closely spaced lines. First fusing portion L1, second fusing portion L2, and third fusing portion L3 are fusing lines formed when first resin sheet 81 and second resin sheet 82 are fused.

First fusing portion L1 defines the plurality of accommodating bag portion 50 so that each accommodating bag portion 50 is provided with opening 55 allowing air to pass therethrough.

Second fusing portion L2 is adjacent to first fusing portion L1 on both external sides of check valve 60 in a direction intersecting a direction in which check valve 60 protrudes from accommodating bag portion 50. Second fusing portion L2 defines channel 70 communicating with opening 55.

Second fusing portion L2 is provided to extend from a portion of first fusing portion L1 that defines those ends of accommodating bag portion 50 which are opposite in a direction in which the plurality of accommodating bag portions 50 are aligned, and extend in a direction in which check valve 60 protrudes from accommodating bag portion 50.

Third fusing portion L3 seals channel 70. Third fusing portion L3 is provided across a portion of check valve 60 that protrudes from accommodating bag portion 50. Specifically, third fusing portion L3 is provided so as to connect one end side of second fusing portion L2 along second end 60b of check valve 60.

In the vicinity of second end 60b of check valve 60, region R2 is disposed that is set to melt at a temperature higher than a temperature at which first resin sheet 81 and second resin sheet 82 melt. For this reason, third fusing portion L3 is provided so as to cover second end 60b.

Third fusing portion L3 is formed after accommodating bag portion 50 receives air through channel 70 and opening 55.

Figure 10:
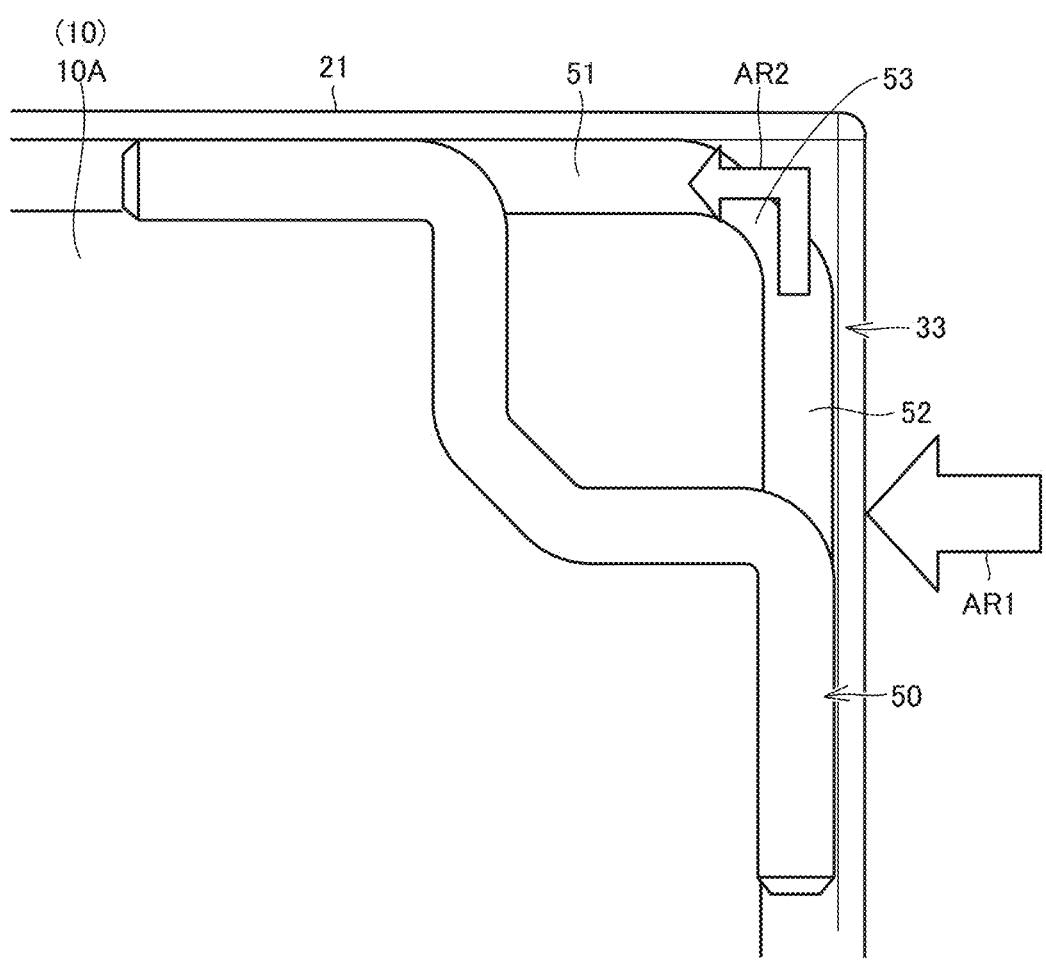
FIG. 10 is a diagram illustrating a state in which an external force acts on an exterior box in the packing state illustrated in FIG. 1.

FIG. 10 is a diagram illustrating a state in which an external force acts on the exterior box in the packing state illustrated in FIG. 1. Note that FIG. 10 shows the image formation apparatus around a right rear corner in a front view.

As shown in FIG. 10, when an external force acts on exterior box 21 in a direction indicated by an arrow AR1, second chamber 52 of accommodating bag portion 50 is pressed. Thereby, the air in second chamber 52 moves toward first chamber 51 through connecting path 53, as indicated by AR2 in the figure.

Figure 11:
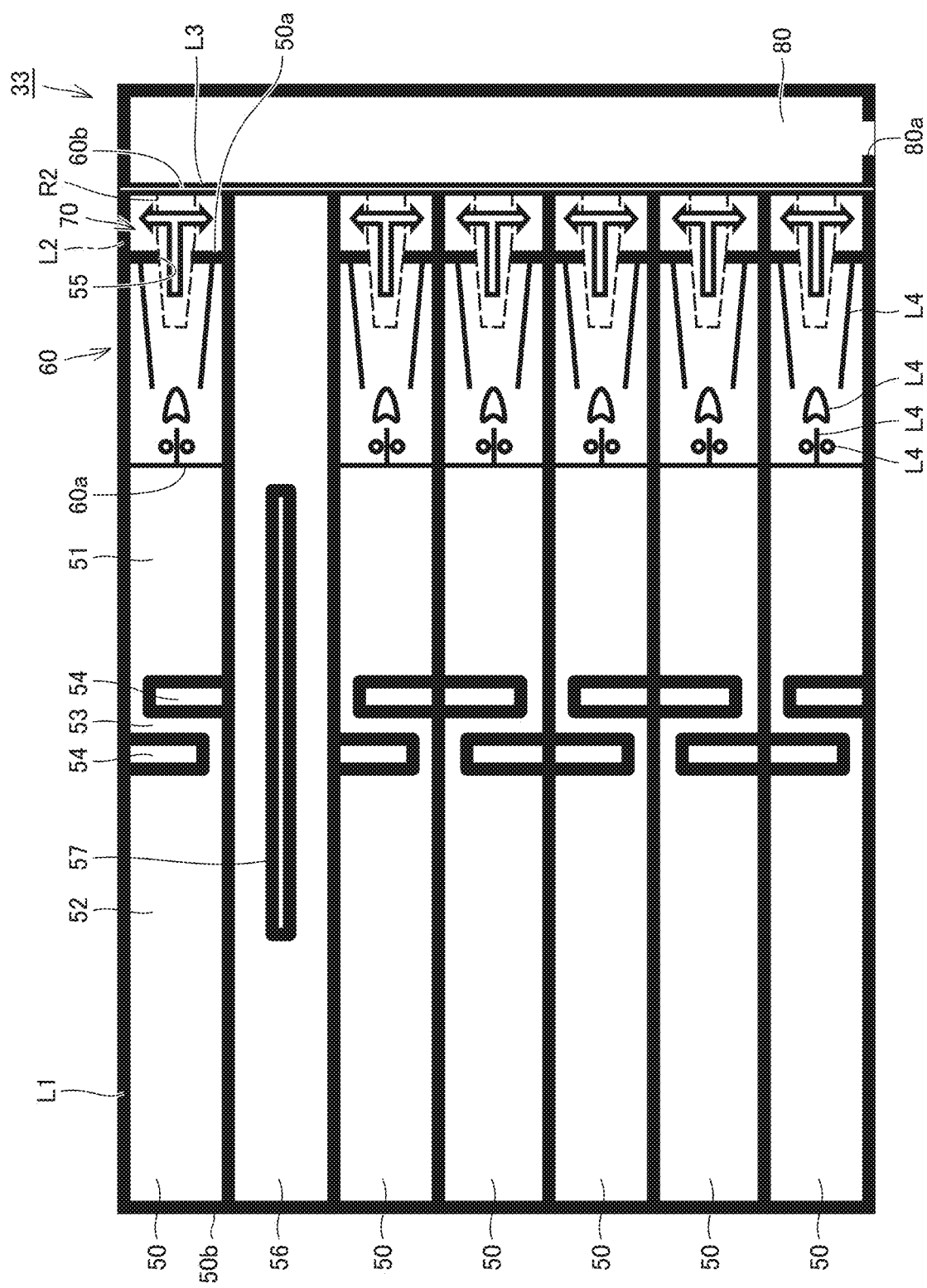
FIG. 11 is a plan view showing the cushioning member with the external force shown in FIG. 10 applied.

FIG. 11 is a plan view showing the cushioning member with the external force shown in FIG. 10 acting thereon. When the check valve is damaged or pressure exceeding the check valve's sealing ability acts, then, as shown in FIG. 11, a portion of the air having moved from second chamber 52 toward first chamber 51 through connecting path 53 passes through opening 55 and moves into channel 70.

Note that channel 70 is sealed by third fusing portion L3 provided across check valve 60. The sealed channel 70 has a space considerably smaller than a configuration in which a space capable of storing air is also formed upstream of check valve 60. This can considerably reduce the amount of air leaking from accommodating bag portion 50 through check valve 60 to channel 70. Cushioning member 33 according to the first embodiment can thus be prevented from having a reduced cushioning function.

Further, as has been described above, in cushioning member 33, first chamber 51 and second chamber 52 are formed in accommodating bag portion 50, and first chamber 51 and second chamber 52 are connected by connecting path 53 that is dog-legged. In such a configuration, when cushioning member 33 is pressed, connecting path 53 serves a resistance and thus consumes a portion of the pressing energy when air moves from first chamber 51 to second chamber 52. In addition, second chamber 52 compresses air, and this step also consumes a portion of the pressing energy. Further, second chamber 52 spreads exterior box 21, and this step also consumes a portion of the pressing energy. A cushioning function is thus exhibited by the above action.

(Manufacturing Method)

Figure 12:
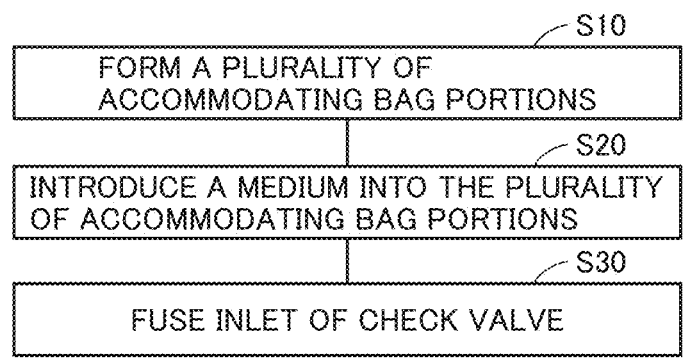
FIG. 12 is a flowchart of a process for manufacturing the cushioning member according to the first embodiment.

FIG. 12 is a flowchart of a process for manufacturing the cushioning member according to the first embodiment. With reference to FIG. 12, the method for manufacturing the cushioning member according to the first embodiment will be described.

As shown in FIG. 12, when manufacturing cushioning member 33 according to the first embodiment, in step S10, first resin sheet 81 and second resin sheet 82 are fused in the form of a bag to form a plurality of accommodating bag portions 50 each having a check valve and capable of accommodating a medium.

Specifically, first film 61 and second film 62 are disposed to face each other in a region in which check valve 60 is formed, and first resin sheet 81 and second resin sheet 82 are overlapped to sandwich first film 61 and second film 62.

Subsequently, first fusing portion L1 that defines accommodating bag portion 50 so as to form opening 55 allowing a medium to pass therethrough, and second fusing portion L2 that defines a channel communicating with opening 55, are formed.

Specifically, a plurality of fusing lines extending continuously from those portions of first and second resin sheets 81 and 82 which sandwich first and second films 61 and 62 to those portions of first and second resin sheets 81 and 82 which do not sandwich first and second films 61 and 62 are formed in a predetermined direction such that the fusing lines are spaced from one another. Moreover, a fusing line is formed so that the plurality of fusing lines in those portions which do not sandwich first film 61 and second film 62 have their respective one end sides connected together. Furthermore, a fusing line is formed in the predetermined direction such that opening 55 is formed in those portions sandwiching first film 61 and second film 62. Thus, first fusing portion L1 and second fusing portion L2 are formed. As a result, the plurality of accommodating bag portions 50, a plurality of check valves 60, channel 70, and introduction path 80 are formed.

The plurality of check valves 60 are formed so as to be aligned in the form of a column, and the above fusing line is formed so as to include a fusing line that defines a boundary between mutually adjacent check valves 60.

Note that second end 60b of check valve 60 is not fused, and an inlet capable of introducing a medium is thus formed on the side of second end 60b of check valve 60. The plurality of check valves have their inlets formed so as to be positioned on a single straight line.

Further, a portion of first and second films 61 and 62 located inside accommodating bag portion 50 is fused to first resin sheet 81 to form fourth fusing portion L4 that defines a channel allowing the medium that has passed through opening 55 to pass through check valve 60.

Moreover, in each accommodating bag portion 50, first resin sheet 81 and second resin sheet 82 are partially fused together to form two strip-shaped fusing portions 54. The two strip-shaped fusing portions 54 are alternately formed in the direction in which accommodating bag portion 50 extends. Thus, first chamber 51 and second chamber 52 aligned in a direction opposite to that in which check valve 60 protrudes from accommodating bag portion 50, and connecting path 53 dog-legged and connecting first chamber 51 and second chamber 52, are formed.

Subsequently, in step S20, air as a medium is introduced into each of the plurality of accommodating bag portions 50 via check valve 60 from introduction path 80 provided upstream of check valve 60. The air introduced into introduction path 80 is introduced into accommodating bag portion 50 through channel 70 and opening 55.

Subsequently, in step S30, after the medium is introduced into each of the plurality of accommodating bag portions 50, the inlet of each check valve is fused. Specifically, third fusing portion L3 connected to second fusing portion L2 and sealing channel 70 is formed. In doing so, third fusing portion L3 is provided across a portion of check valve 60 that protrudes from accommodating bag portion 50. That is, a fusing portion that fuses the inlet of check valve 60 is provided so as to intersect a fusing line that defines a boundary between mutually adjacent check valves 60. Third fusing portion L3 is also provided so as to cover second end 60b of check valve 60. In this way, the plurality of check valves 60 have their respective inlets fused to prevent the medium from moving between the plurality of accommodating bag portions 50.

Cushioning member 33 according to the first embodiment can thus be manufactured through the steps as described above.

Second Embodiment

Figure 13:
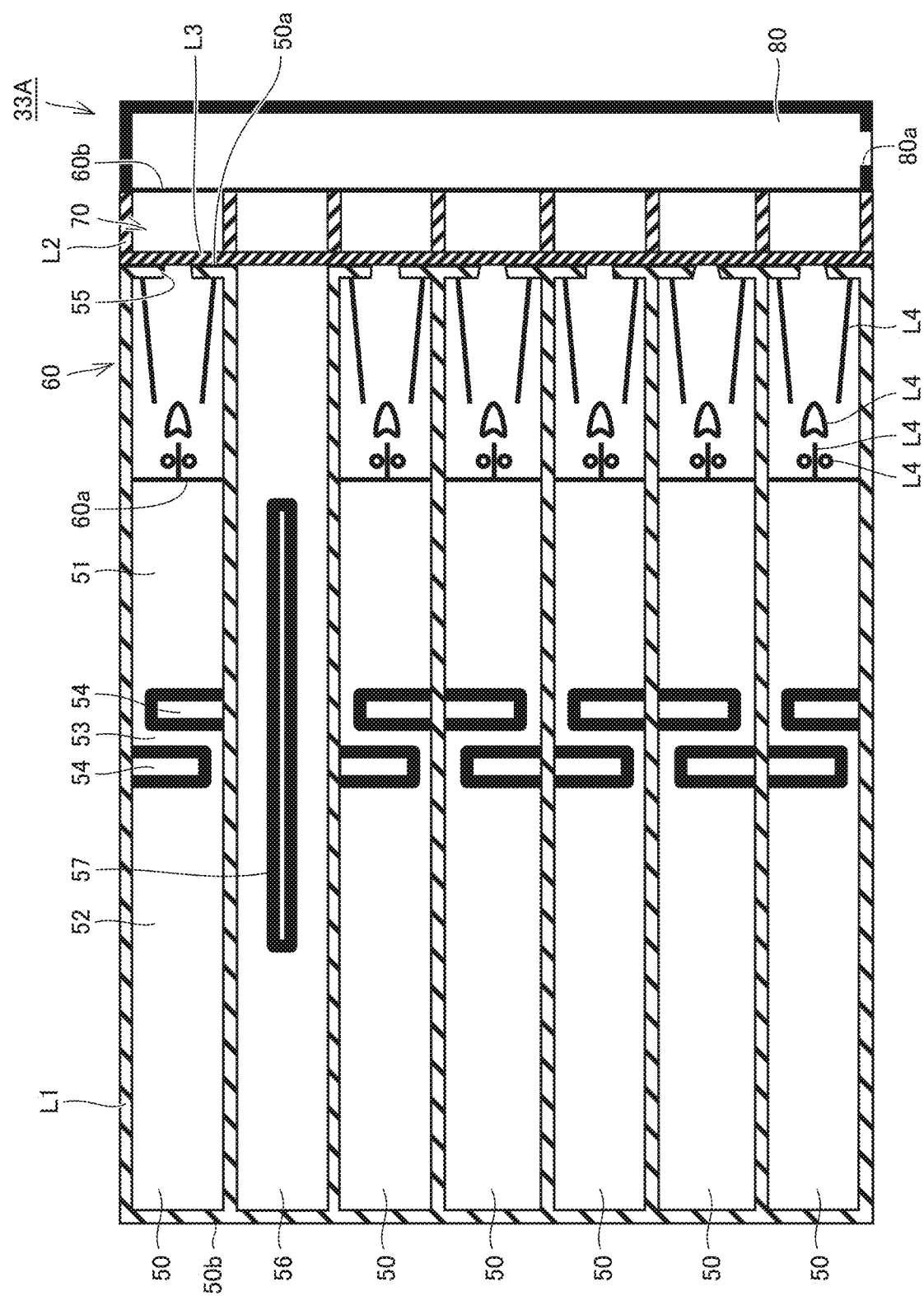
FIG. 13 is a plan view showing a cushioning member according to a second embodiment.

FIG. 13 is a plan view showing a cushioning member according to a second embodiment. A cushioning member 33A according to the second embodiment will be described with reference to FIG. 13.

As shown in FIG. 13, cushioning member 33A according to the second embodiment is different from cushioning member 33 according to the first embodiment in the configuration of first film 61 and the position of third fusing portion L3. The remainder in configuration is substantially the same.

In the second embodiment, first film 61 at a portion thereof protruding from opening 55 does not have a region that is less fusible to prevent fusion of second film 62 to first film 61. For this reason, a region which continues from second end 60b of check valve 60 to a portion of first fusing portion L1 that forms a boundary line between accommodating bag portion 50 and an outside can entirely be a fusing region.

Third fusing portion L3 is provided between second end 60b of check valve 60 and accommodating bag portion 50 at a position closer to accommodating bag portion 50. Specifically, third fusing portion L3 is provided in the vicinity of one end 50a of accommodating bag portion 50.

In cushioning member 33A according to the second embodiment, third fusing portion L3 is provided in the vicinity of one end 50a of accommodating bag portion 50, and the amount of air that moves to channel 70 when accommodating bag portion 50 is pressed can be reduced to be smaller than in the first embodiment. This can further suppress reduction of the cushioning function, as compared with the first embodiment.

Note that cushioning member 33A according to the second embodiment can be manufactured in conformity with the method for manufacturing cushioning member 33 according to the first embodiment.

In the second embodiment, less fusible region R2 may be provided as in the first embodiment. In that case, less fusible region R2 can be fused by fusing at a temperature equal to or higher than the melting point of the less fusible portion.

Third Embodiment

Figure 14:
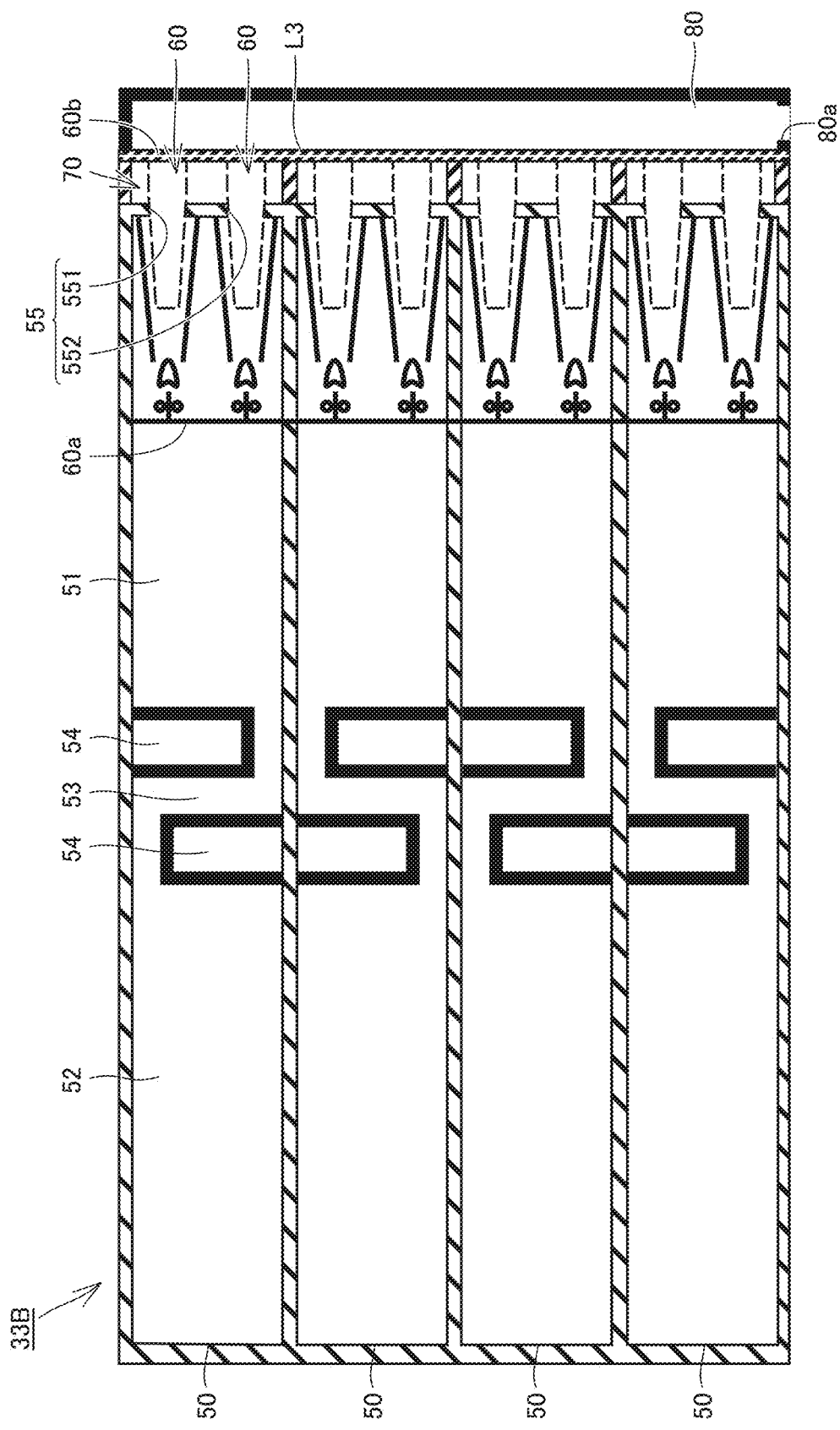
FIG. 14 is a plan view showing a cushioning member according to a third embodiment.

FIG. 14 is a plan view showing a cushioning member according to a third embodiment. With reference to FIG. 14, a cushioning member 33B according to the third embodiment will be described.

As shown in FIG. 14, cushioning member 33B according to the third embodiment differs from cushioning member 33 according to the first embodiment in the configuration of the opening and the number of check valves 60. The remainder in configuration is substantially the same.

In the third embodiment, opening 55 includes a first opening 551 and a second opening 552 aligned in a direction intersecting the direction in which check valve 60 protrudes from accommodating bag portion 50, and check valve 60 is provided for each of first opening 551 and second opening 552.

Even with such a configuration, cushioning member 33B according to the third embodiment can obtain substantially the same effect as the first embodiment.

When accommodating bag portion 50 has an increased width, first opening 551 and second opening 552 provided as described above facilitate introducing air into accommodating bag portion 50.

Note that cushioning member 33B according to the third embodiment can be manufactured in conformity with the method for manufacturing cushioning member 33 according to the first embodiment.

Fourth Embodiment

Figure 15:
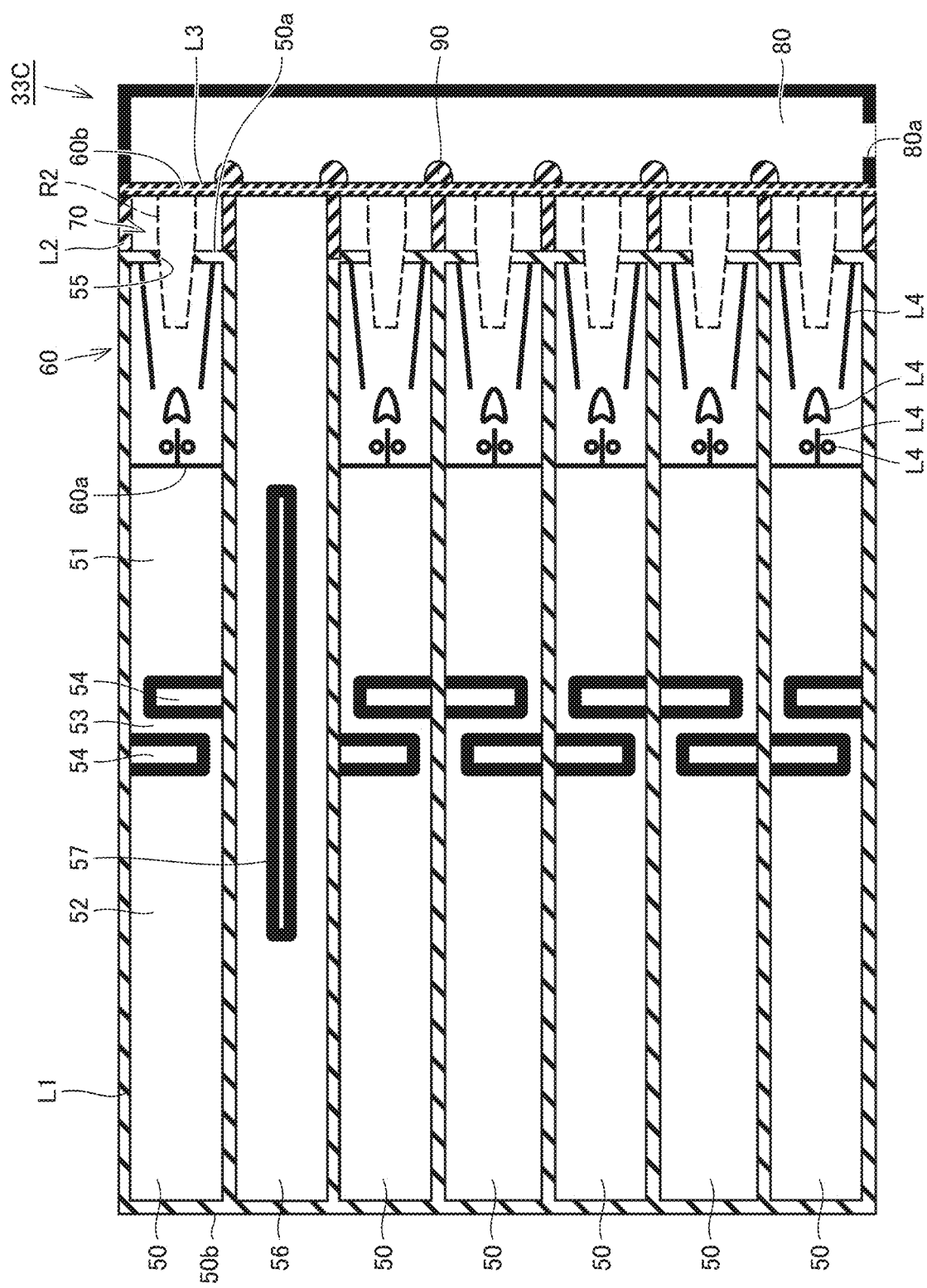
FIG. 15 is a plan view showing a cushioning member according to a fourth embodiment.

FIG. 15 is a plan view showing a cushioning member according to a fourth embodiment. With reference to FIG. 15, a cushioning member 33C according to the fourth embodiment will be described.

As shown in FIG. 15, cushioning member 33C according to the fourth embodiment is different from cushioning member 33 according to the first embodiment in that the former has some of second fusing portions L2 different in shape than the latter. The remainder in configuration is substantially the same.

At least, a tip of second fusing portion L2 connected to a portion of first fusing portion L1 that defines a boundary between mutually adjacent accommodating bag portions 50 has a rounded portion 90. Further, the rounded tip of second fusing portion L2 protrudes from third fusing portion L3.

In other words, at least a tip of a fusing line that defines a boundary between mutually adjacent check valves 60 is provided so as to include rounded portion 90. Further, the rounded tip of the fusing line is provided so as to protrude from a fusing portion that fuses the inlet of check valve 60.

The tip of second fusing portion L2 may have a semicircular shape or a circular shape. Further, the tip of second fusing portion L2 may have a semi-oval shape or an oval shape. The tip of second fusing portion L2 may have a polygonal shape with rounded corners.

Note that cushioning member 33C according to the fourth embodiment can be manufactured in conformity with the method for manufacturing cushioning member 33 according to the first embodiment. In that case, in the step of forming the plurality of accommodating bag portions 50 (S10), a fusing line that defines a boundary between mutually adjacent check valves 60 is formed so as to at least have a tip including a rounded portion. Further, in the step of fusing the inlet of check valve 60 (S30), a fusing portion to fuse the inlet of check valve 60 is formed so that the tip of the fusing line protrudes beyond the fusing portion. Thus, the fusing portion can be easily formed.

Even with such a configuration, cushioning member 33C according to the fourth embodiment can obtain substantially the same effect as the first embodiment.

By forming second fusing portion L2 to have a rounded tip, in the step of introducing a medium into the plurality of accommodating bag portions (S20), a force by which first resin sheet 81 and second resin sheet 82 are pulled at the tip of second fusing portion L2 when the sheets expand in the form of a column can be dispersed by the rounded portion. This can suppress damage to first resin sheet 81 and second resin sheet 82.

Fifth Embodiment

Figure 16:
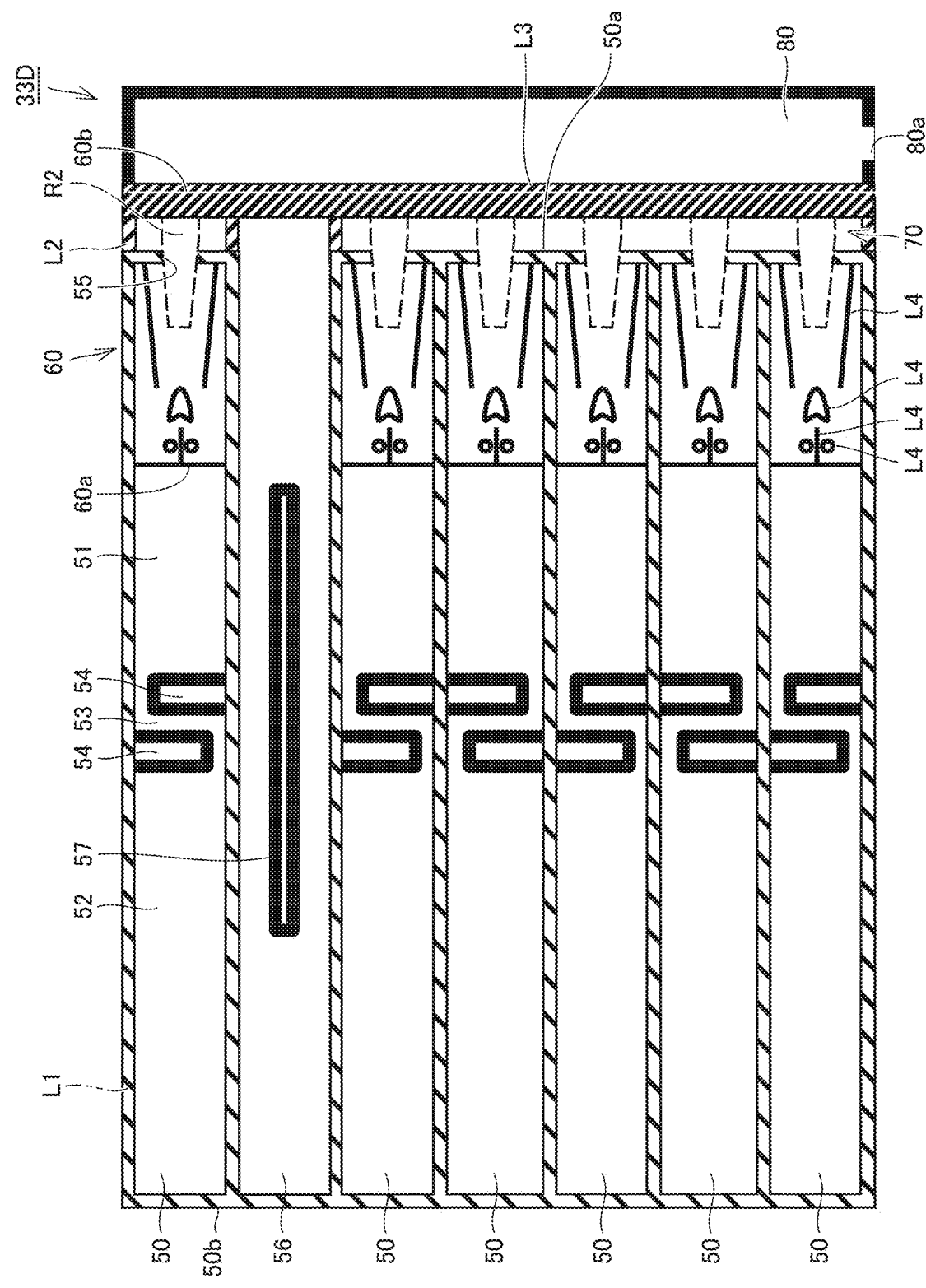
FIG. 16 is a plan view showing a cushioning member according to a fifth embodiment.

FIG. 16 is a plan view showing a cushioning member according to a fifth embodiment. With reference to FIG. 16, a cushioning member 33D according to the fifth embodiment will be described.

As shown in FIG. 16, cushioning member 33D according to the fifth embodiment differs from cushioning member 33 according to the first embodiment in that the former does not have a fusing line that defines a boundary upstream of mutually adjacent check valves 60. That is, in cushioning member 33D according to the fifth embodiment, there is no second fusing portion L2 connected to a portion of first fusing portion L1 that defines a boundary between mutually adjacent accommodating bag portions 50.

In that case, channel 70 communicating with the plurality of accommodating bag portions 50 has an increased width. Accordingly, third fusing portion L3 has an increased width to reduce an amount of air which leaks to channel 70 through opening 55 when the plurality of accommodating bag portions 50 are externally pressed.

In contrast, third fusing portion L3 may have a decreased width when second fusing portion L2 connected to the portion of first fusing portion L1 that defines the boundary between mutually adjacent accommodating bag portions 50 is formed, as in the first to fourth embodiments. Thus, third fusing portion L3 can be easily formed.

Even with such a configuration, cushioning member 33D according to the fifth embodiment can obtain substantially the same effect as the first embodiment.

Note that cushioning member 33D according to the fifth embodiment can be manufactured in conformity with the method for manufacturing cushioning member 33 according to the first embodiment. In that case, in the step of forming the plurality of accommodating bag portions 50 (S10), the fusing line that defines the boundary upstream of mutually adjacent check valves 60 is not formed.

While in the first to fifth embodiments a case where air is used as a medium has been described as an example, this is not exclusive and the medium may be a gas such as nitrogen, or it may be a gelated member, liquid, or the like.

While in the first to fifth embodiments a case where a cushioning member is manufactured by fusing a plurality of resin sheets has been described as an example, this is not exclusive, and the cushioning member may be manufactured by folding back and fusing a single resin sheet.

While in the first to fourth embodiments a case has been described in which, in the step of forming the plurality of accommodating bag portions 50, check valves 60 that the plurality of accommodating bag portions 50 have, respectively, are formed to be aligned in the form of a column and a fusing line is also formed that defines a boundary between mutually adjacent check valves 60, and in the step of fusing the inlet of check valve 60 (S30), a fusing portion is formed to intersect the fusing line, this is not exclusive. In the step of forming the plurality of accommodating bag portions 50 (S10), the plurality of accommodating bag portions 50 may have their respective check valves 60 formed to be aligned in the form of a column without forming the fusing line that defines the boundary between mutually adjacent check valves 60. In that case, it is preferable in the step of fusing the inlet of check valve 60 (S30) to form the fusing line that defines the boundary between the mutually adjacent check valves and form the fusing portion so as to intersect the fusing line.

The cushioning member based on a first aspect of the present invention described above is composed of at least one resin sheet fused in the form of a bag. The cushioning member includes: an accommodating bag portion that accommodates a medium; a first fusing portion that defines the accommodating bag portion such that the accommodating bag portion is provided with an opening allowing the medium to pass therethrough; a check valve having a first end and a second end and provided at the opening such that the first end is located inside the accommodating bag portion and the second end is located outside the accommodating bag portion; the medium accommodated in the accommodating bag portion; a second fusing portion that is immediately adjacent to the first fusing portion on those end sides of the check valve which are opposite in a direction intersecting a direction in which the check valve protrudes from the accommodating bag portion, and defines a channel that communicates with the opening; and a third fusing portion that is connected to the second fusing portion and seals the channel. The third fusing portion is provided across a portion of the check valve that protrudes from the accommodating bag portion.

Note that the third fusing portion being provided across the check valve also includes a case in which the fusing portion is provided to cover the second end when the check valve is processed to be less fusible in the vicinity of the opening.

In the cushioning member according to the first aspect of the present invention, the third fusing portion may be provided between the second end and the accommodating bag portion at a position closer to the accommodating bag portion. Furthermore, a region which covers the second end and continues to a portion of the first fusing portion that forms a boundary line between the accommodating bag portion and an outside may entirely be a fusing region.

In the cushioning member according to the first aspect of the present invention, the opening may include a first opening and a second opening aligned in a direction intersecting the direction in which the check valve protrudes from the accommodating bag portion, and the check valve may be provided for each of the first opening and the second opening.

In the cushioning member according to the first aspect of the present invention, the accommodating bag portion may include a first chamber and a second chamber aligned in a direction opposite to that in which the check valve protrudes from the accommodating bag portion, and a connecting path dog-legged and connecting the first chamber and the second chamber.

In the cushioning member according to the first aspect of the present invention, the accommodating bag portion may be provided to be bendable at the connecting path.

In the cushioning member according to the first aspect of the present invention, the accommodating bag portion may be a plurality of such accommodating bag portions aligned. Furthermore, the second fusing portion may be provided to extend from a portion of the first fusing portion that defines those ends of the accommodating bag portion which are opposite in a direction in which the plurality of accommodating bag portions are aligned, and extend in the direction in which the check valve protrudes from the accommodating bag portion.

In the cushioning member according to the first aspect of the present invention, it is preferable that the second fusing portion connected to a portion of the first fusing portion that defines a boundary between mutually adjacent accommodating bag portions has a tip including a rounded portion.

In the cushioning member according to the first aspect of the present invention, it is preferable that the tip of the second fusing portion connected to the portion of the first fusing portion that defines the boundary between mutually adjacent accommodating bag portions is provided so as to protrude from the third fusing portion.

A cushioning member according to a second aspect of the present invention described above is a resin sheet fused in the form of a bag. The cushioning member includes a plurality of accommodating bag portions each having a check valve and accommodating a medium introduced through an inlet of the check valve, and a fusing portion at which each inlet is fused to prevent the medium from moving between the plurality of accommodating bag portions.

In the cushioning member according to the second aspect of the present invention, the check valves may have their respective inlets aligned in a single straight line.

In the cushioning member according to the second aspect of the present invention, the plurality of accommodating bag portions may have the check valves aligned in the form of a column. In that case, it is preferable that the cushioning member includes a fusing line that defines a boundary between mutually adjacent check valves, and it is preferable that the fusing portion is provided to intersect the fusing line.

In the cushioning member according to the second aspect of the present invention, it is preferable that the fusing line has a tip including a rounded portion.

In the cushioning member according to the second aspect of the present invention, it is preferable that the tip of the fusing line is provided so as to protrude from the fusing portion.

A method for manufacturing a cushioning member according to a third aspect of the present invention described above is a method for manufacturing a cushioning member composed of at least one resin sheet fused in the form of a bag. The present method for manufacturing a cushioning member includes: fusing at least one resin sheet in the form of a bag to form a plurality of accommodating bag portions each having a check valve and capable of accommodating a medium; introducing the medium into the accommodating bag portions via the check valve from a channel provided upstream of the check valve; and fusing an inlet of the check valve after the medium is introduced into the accommodating bag portions.

In the method for manufacturing the cushioning member according to the third aspect of the present invention, in the step of forming the plurality of accommodating bag portions, the check valves of the plurality of accommodating bag portions may have their respective inlets formed to be aligned in a single straight line.

In the method for manufacturing the cushioning member according to the third aspect of the present invention, in the step of forming the plurality of accommodating bag portions, it is preferable that the plurality of accommodating bag portions have their respective check valves formed to be aligned in the form of a column and it is preferable to form a fusing line that defines a boundary between mutually adjacent ones of the check valves.

Further, in the step of fusing the inlet, it is preferable to form a fusing portion so as to intersect the fusing line.

In the method for manufacturing the cushioning member according to the third aspect of the present invention, in the step of forming the plurality of accommodating bag portions, it is preferable to form the fusing line to have a tip including a rounded portion.

In the method for manufacturing the cushioning member according to the third aspect of the present invention, it is preferable that in the step of fusing the inlet, the fusing portion is formed so that the tip of the fusing line protrudes from the fusing portion.

In the method for manufacturing the cushioning member according to the third aspect of the present invention, in the step of forming the plurality of accommodating bag portions, the plurality of accommodating bag portions may have their respective check valves formed to be aligned in the form of a column. In that case, in the step of fusing the inlet, a fusing line that defines a boundary between mutually adjacent ones of the check valves may be formed and a fusing portion may be formed so as to intersect the fusing line.

Although embodiments of the present invention have been described and illustrated in detail, the disclosed embodiments are made for purposes of illustration and example only and not limitation. The scope of the present invention should be interpreted by terms of the appended claims.

What is claimed is:

1. A cushioning member composed of at least one resin sheet fused in a form of a bag, comprising:
    an accommodating bag portion that accommodates a medium;
    a first fusing portion that defines a perimeter of the accommodating bag portion wherein, at an end portion of the accommodating bag portion, the first fusing portion is bent inward toward a center portion of the accommodating bag portion such that an opening is defined that allows the medium to pass therethrough;
    a check valve having a first end and a second end and provided at the opening such that the first end is located inside the accommodating bag portion and the second end is located outside the accommodating bag portion;
    the medium accommodated in the accommodating bag portion;
    a second fusing portion (i) that is immediately adjacent to the first fusing portion on end sides of the check valve that are opposite in a direction intersecting a direction in which the check valve protrudes from the accommodating bag portion, and (ii) defines a channel that communicates with the opening; and
    a third fusing portion that is connected to the second fusing portion and seals the channel, the third fusing portion being provided across and abuts against a portion of the check valve that protrudes from the accommodating bag portion.

2. The cushioning member according to claim 1, wherein the third fusing portion is provided between the second end and the accommodating bag portion at a position closer to the accommodating bag portion.

3. The cushioning member according to claim 1, wherein the opening includes a first opening and a second opening aligned in the direction intersecting the direction in which the check valve protrudes from the accommodating bag portion, and the check valve is provided for each of the first opening and the second opening.

4. The cushioning member according to claim 1, wherein the accommodating bag portion includes a first chamber and a second chamber aligned in a direction opposite to that in which the check valve protrudes from the accommodating bag portion, and a connecting path dog-legged and connecting the first chamber and the second chamber.

5. The cushioning member according to claim 4, wherein the accommodating bag portion is provided to be bendable at the connecting path.

6. The cushioning member according to claim 1, wherein the accommodating bag portion is a plurality of such accommodating bag portions aligned, and the second fusing portion is provided to extend from a portion of the first fusing portion that defines those ends of the accommodating bag portion which are opposite in a direction in which the plurality of accommodating bag portions are aligned, and extend in the direction in which the check valve protrudes from the accommodating bag portion.

7. The cushioning member according to claim 6, wherein the second fusing portion connected to a portion of the first fusing portion that defines a boundary between mutually adjacent ones of the accommodating bag portions has a tip including a rounded portion.

8. The cushioning member according to claim 7, wherein the tip of the second fusing portion connected to the portion of the first fusing portion that defines the boundary between mutually adjacent ones of the accommodating bag portions protrudes from the third fusing portion.

9. A cushioning member composed of at least one resin sheet fused in a form of a bag, comprising:
    a plurality of accommodating bag portions having check valves, respectively, and accommodating a medium introduced from inlets of the check valves, respectively; and
    a fusing portion at which the inlets are fused to prevent the medium from moving between the plurality of accommodating bag portions,
    wherein the plurality of accommodating bag portions have their respective check valves aligned in a column, the cushioning member further comprises a fusing line that defines a boundary between mutually adjacent ones of the check valves, and the fusing portion is provided to intersect the fusing line.

10. The cushioning member according to claim 9, wherein the check valves have their respective inlets aligned in a single straight line.

11. The cushioning member according to claim 9, wherein the fusing line has a tip including a rounded portion.

12. The cushioning member according to claim 11, wherein the tip of the fusing line is provided so as to protrude from the fusing portion.

* * * * *